Nov. 10, 1970   F. V. AMOROSO ET AL   3,538,677
CAPSULE CLOSING AND SEALING APPARATUS
Filed Aug. 5, 1968   8 Sheets-Sheet 2

INVENTORS
FRANK V. AMOROSO &
WERNER L. TOLLEFSBOL
BY

INVENTORS
FRANK V. AMOROSO &
WERNER L. TOLLEFSBOL

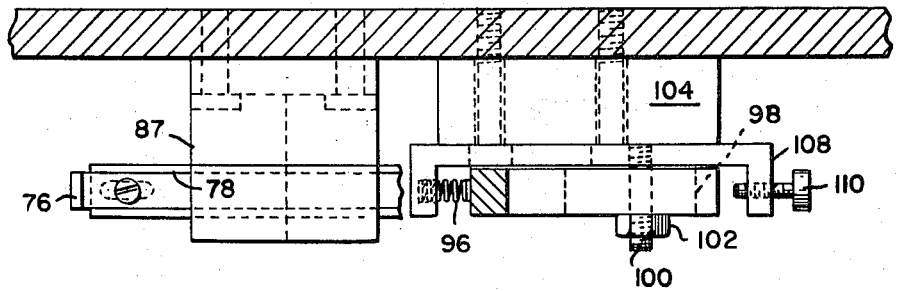
FIG. 4.
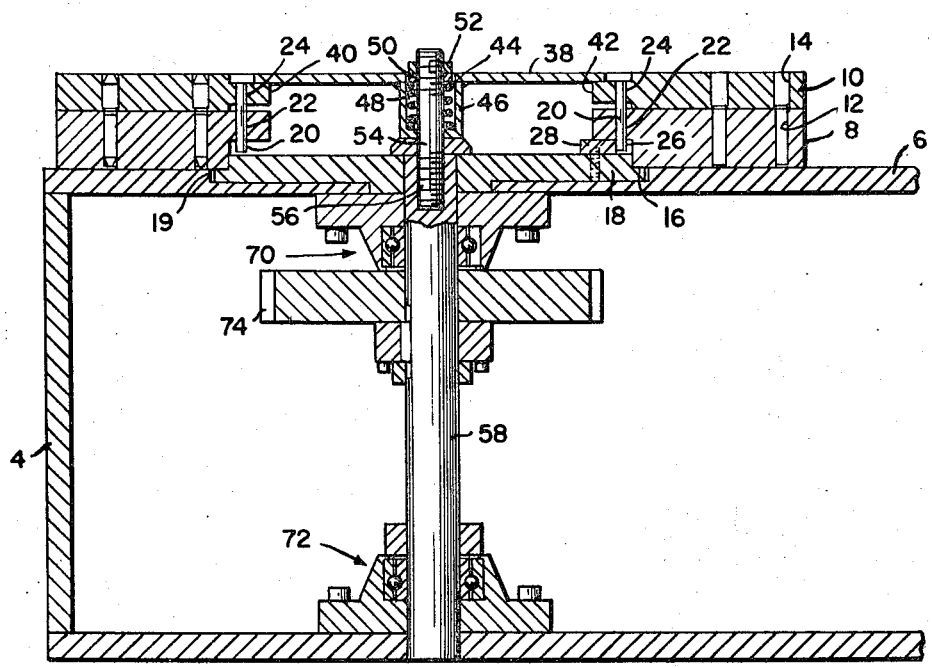
FIG. 5.
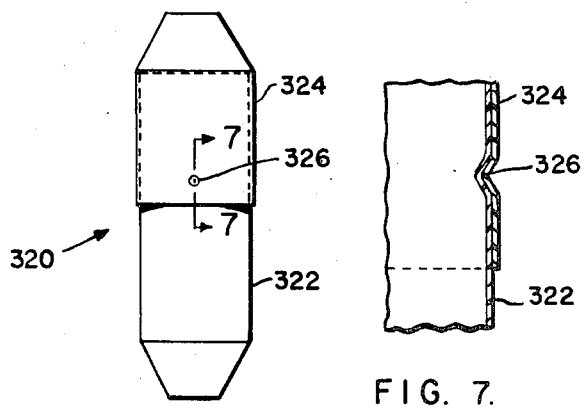
FIG. 6.
FIG. 7.
INVENTORS
FRANK V. AMOROSO &
WERNER L. TOLLEFSBOL
ATTORNEYS

INVENTORS
FRANK V. AMOROSO &
WERNER L. TOLLEFSBOL

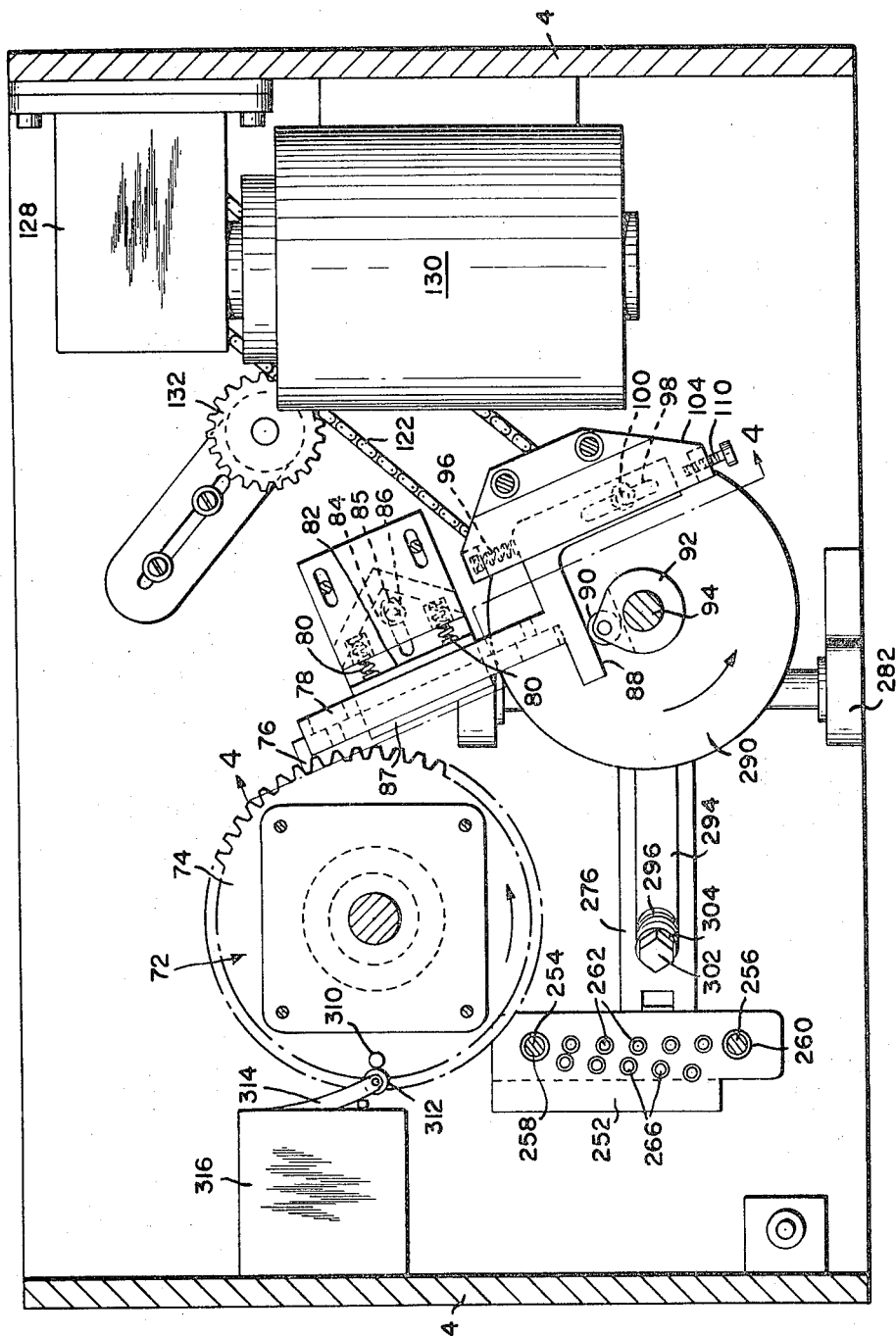

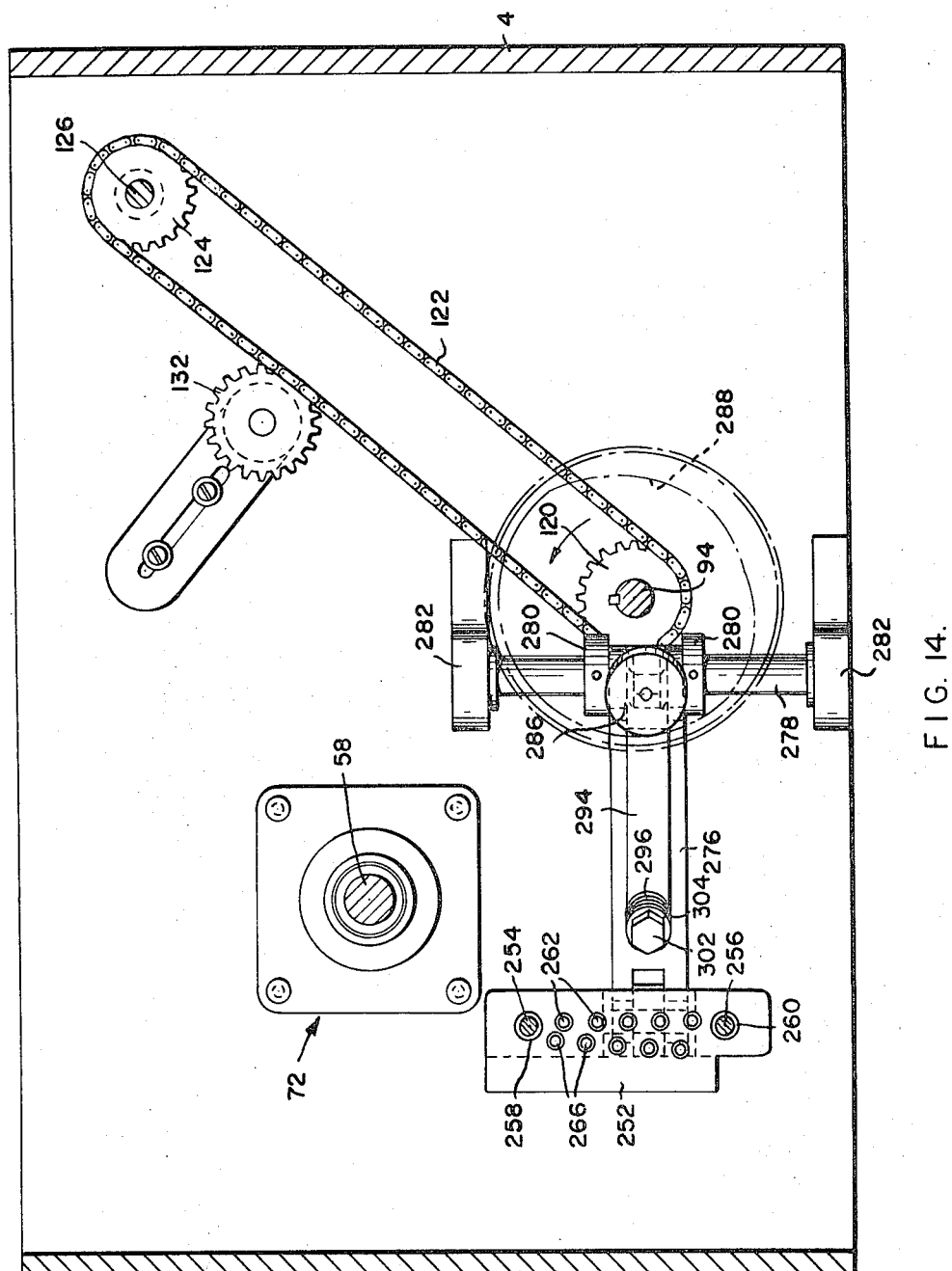

United States Patent Office 3,538,677
Patented Nov. 10, 1970

3,538,677
CAPSULE CLOSING AND SEALING APPARATUS
Frank V. Amoroso, Maple Shade, N.J., and Werner L. Tollefsbol, Philadelphia, Pa., assignors to Smith Kline & French Laboratories, Philadelphia, Pa., a corporation of Pennsylvania
Filed Aug. 5, 1968, Ser. No. 750,149
Int. Cl. B65b 7/28
U.S. Cl. 53—299                    8 Claims

ABSTRACT OF THE DISCLOSURE

A member having bores therethrough for the reception of capsules is associated with a pair of mated rings which respectively have bores for the reception of a series of capsule caps and a series of capsule bodies. A capsule stop is mounted adjacent the capsule receiving member. The mated rings are rotated stepwise to successively position their aligned bores with the capsule stop and the bores in the capsule receiving member. Pushers are provided to close together each capsule cap and body by urging the capsule against the capsule stop and a pusher advances each mated capsule body and cap into a bore of the capsule receiving member. A heat sealing member is advanced into the bores of the capsule receiving member to seal each capsule cap to the associated body.

BACKGROUND OF THE INVENTION

It is well known to heat seal capsules made of thermoplastic material for example, gelatin medicament capsules. A typical capsule sealing apparatus is disclosed in H. W. Greer Pat. 2,940,234 issued June 14, 1960. The heretofore used capsule sealing apparatus requires completion of the capsule loading and closing operation prior to its use. Thus, after the capsule is held in one ring for loading and the said ring is mated with the second ring containing the capsule caps, the mated rings are placed on a machine having means for advancing the capsule bodies into the capsule caps and subsequently discharging the thus mated capsule caps and loaded bodies. The discharged loaded capsules are then fed to capsule sealing apparatus for the sealing operation.

This invention eliminates a number of steps used heretofore, since it accepts the mated rings containing the separated loaded capsule bodies and capsule caps and carries out both the capsule closure operation and the heat sealing operation.

INVENTION SUMMARY

Capsule closing and heat sealing apparatus has a member having a bore therethrough for the reception of a capsule associated with a pair of mated rings one of which having bores for the reception of a series of capsule caps and one of which having bores for the reception of a series of loaded capsule bodies in line with the caps. A capsule stop is mounted adjacent the ring having the bores for the caps. The apparatus has means to rotate the rings stepwise to succesively position the aligned bores of the rings with the capsule stop and the bore in the capsule receiving member in synchronization with means to advance the capsule body towards the associated capsule cap and the capsule stop to form a closed capsule and with means to advance each closed capsule into the bore of the capsule receiving member. Heat sealing means contact the capsule cap in the bore of the capsule receiving member and seal the cap to the associated body.

DESCRIPTION OF THE DRAWINGS

FIG. 4 is a vertical section partially broken away taken on the plane indicated by the line 4—4 in FIG. 12;
FIG. 5 is a vertical section partially broken away taken on a plane indicated by the line 5—5 in FIG. 1;
FIG. 6 is an elevation of a capsule after having been closed and sealed by the apparatus of FIG. 5;
FIG. 7 is an enlarged vertical section partially broken away taken on the plane indicated by the line 7—7 in FIG. 6;
FIG. 12 is a horizontal section taken on the plane indicated by the line 12—12 in FIG. 2;
FIG. 14 is a horizontal section taken on the plane indicated by the line 14—14 in FIG. 2.

PREFERRED EMBODIMENT

Figure 3:
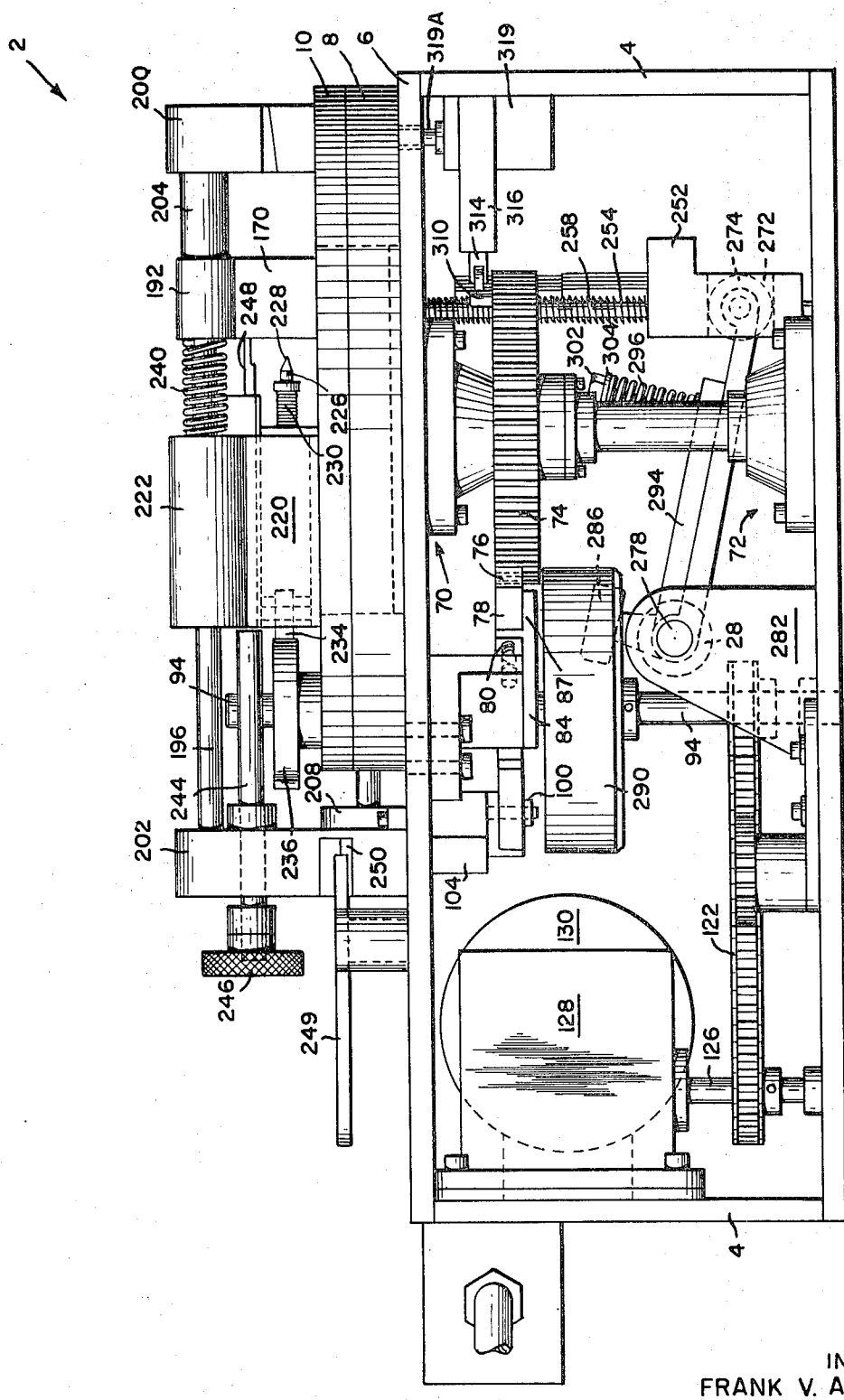
FIG. 3 is a front elevation of the apparatus of FIG. 1.

As best seen in FIG. 3, a capsule closing and sealing apparatus 2 has a frame 4 on which is mounted a top plate 6. Mounted on plate 6 are a pair of mated capsule rings 8 and 10 with ring 8 having bores 12 (FIG. 5) for the reception of capsule bodies and ring 10 having bores 14 for the reception of capsule caps. As best seen in FIG. 5 ring 8 also rests on flange 16 of disc 18 mounted in opening 19 in plate 6. Ring 18 carries a pair of pins 20, 20 secured by a pressed fit in openings 22, 22 and received in openings 24,24 respectively in ring 10. One of the pins 20 extends downwardly into opening 26 of block 28 which is fixedly secured to disc 18. A compression coil spring 30 in bore 32 in block 28 (FIG. 1) urges ball 34 to hold the adjacent pin 20 tightly but releasably. A rotatable bar 38 engages ears 40 and 42 and has a central opening 44 (FIG. 5) about the periphery of which is secured a cup 46 containing a compression coil spring 48. A washer 50 bears against the upper end of spring 48 and is held in place by a nut 52 threaded to a shaft 54 which passes downwardly through spring 48 and cup 46 to threadedly engage at 56 shaft 58 (FIG. 5).

Shaft 58 which is secured to disc 18 is mounted for rotation in bearings indicated at 70 and 72 and has secured thereto gear 74. Gear 74 is engaged by a tooth 76 (FIG. 12) of a ratchet 78 which is biased towards gear 74 by a pair of compression springs 80, 80 which bear against flange 82 of a slidable plate 84 having a slot 85 through which passes a bolt 86 to permit pivotal movement of plate 84. Ratchet 78 is slidably mounted between flange 87 of plate 84 and flange 82. Ratchet 78 has a cam follower portion 88 engaged by a cam follower roller 90 secured to cam 92 mounted on shaft 94. A compression spring 96 biases cam follower portion 88 against roller 90. Ratchet 88 has a slot 98 through which passes a bolt 100 to which is secured a nut 102 (FIG. 4) to support ratchet 78. Bolt 100 is fixedly secured to a bracket 108 which carries a threaded stop member 110 to limit the travel of ratchet 78.

As best seen in FIG. 14 shaft 94 is fixedly secured to a sprocket 120 carrying a chain 122 driven by sprocket 124 on shaft 126. Shaft 126 is connected to a reduction gear drive 128 (FIG. 13) which in turn is driven by a motor indicated at 130. An adjustable idler sprocket 132 is provided to control the slack in chain 122.

Figure 13:
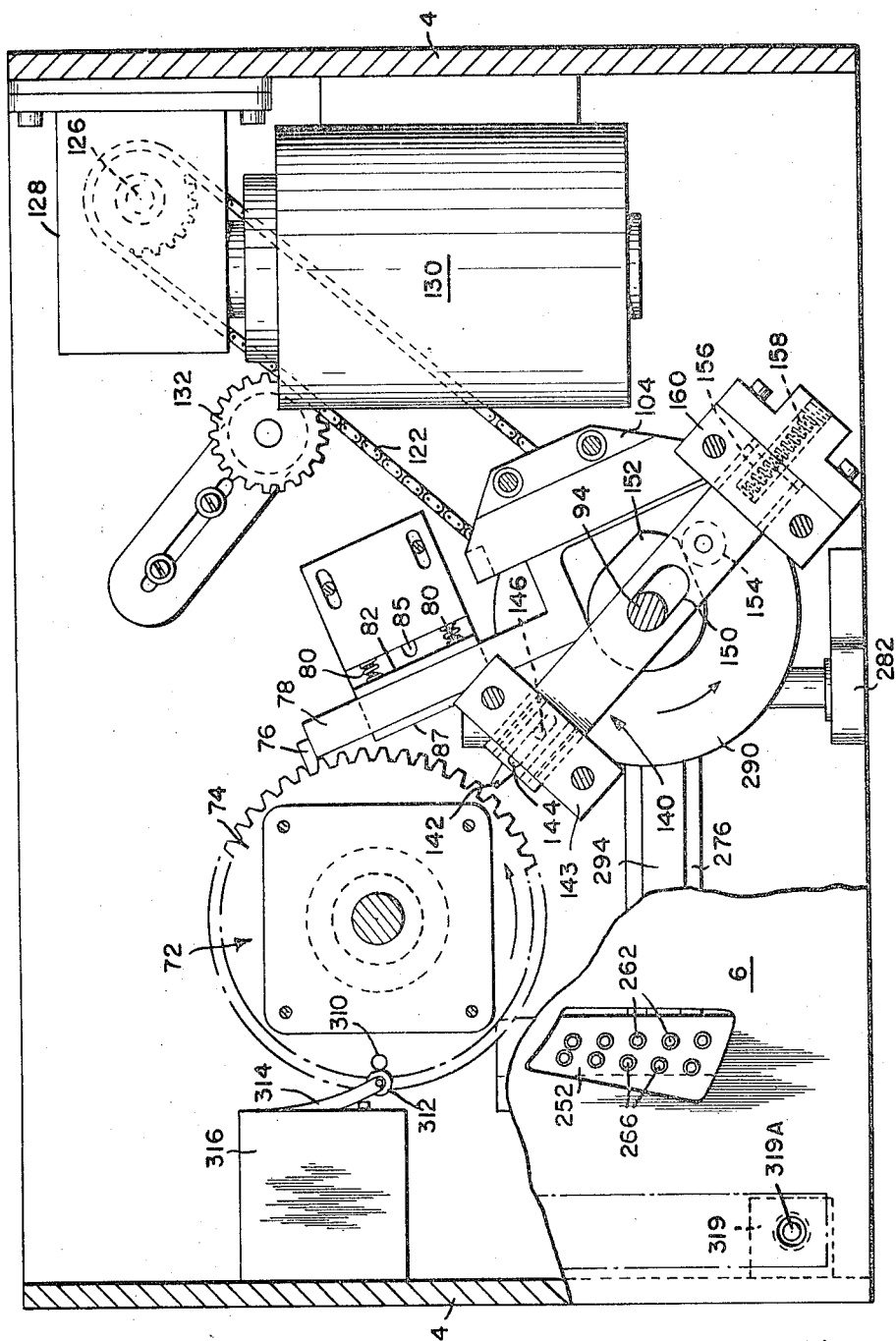
FIG. 13 is a horizontal section taken on the plane indicated by the line 13—13 in FIG. 2.

Referring now to FIG. 13 a gear arresting member 140 has a tooth 142 adapted to enter between the teeth of gear 74. Member 140 is slidably supported in bracket 143 and has a slot 144 which receives a bolt indicated at 146 which adjustably supports tooth 142. Arresting member 140 is provided with a slot 150 to accommodate shaft 94 to which is secured a cam 152 which engages a cam follower roller 154 secured to arresting member 140 which is biased towards gear 74 by a compression spring 158 which is received in a bore portion 156 of member 140. Member 140 is slidably supported in bracket 160.

Figure 1:
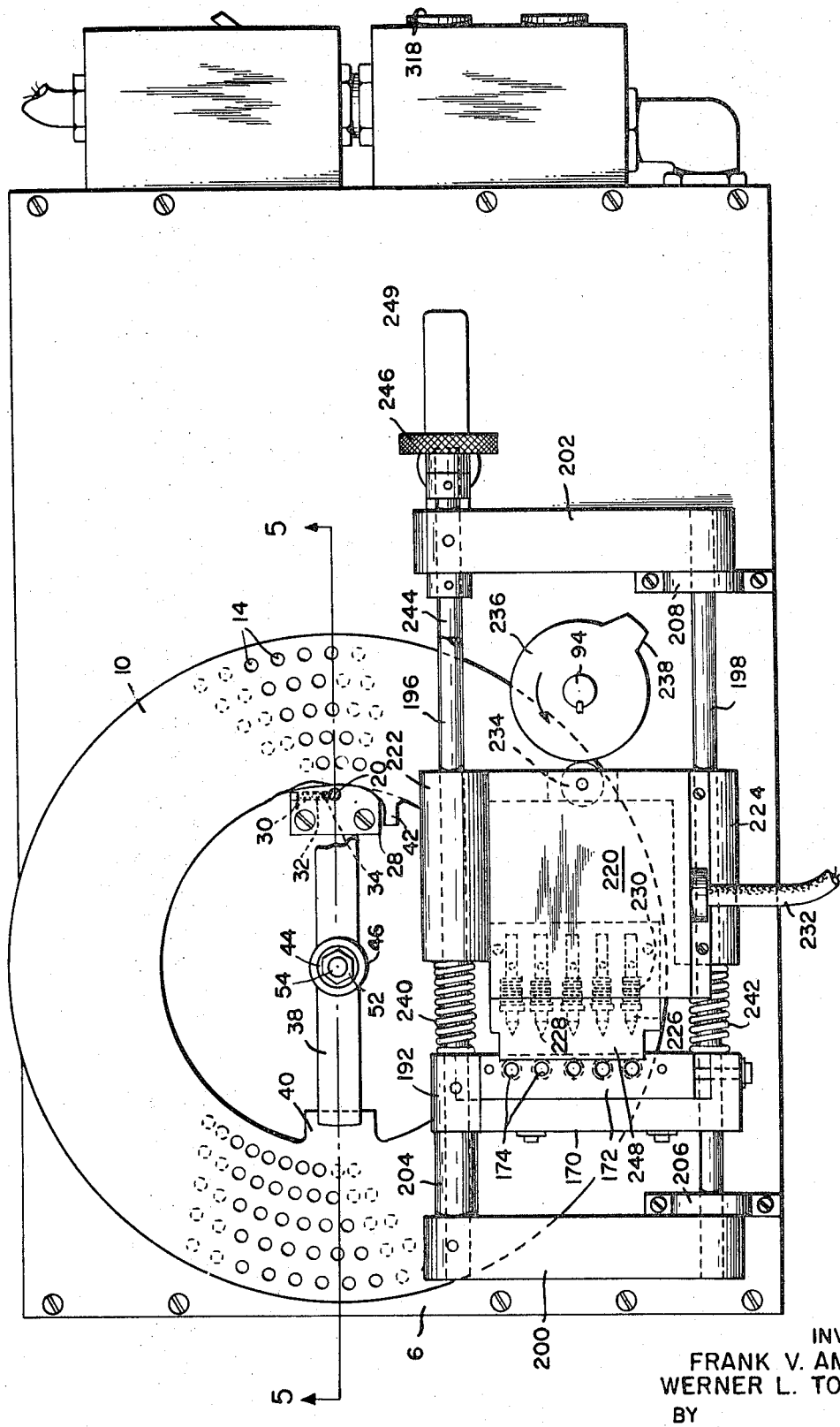
FIG. 1 is a plan view of capsule closing and sealing apparatus in accordance with the invention.
Figure 8:
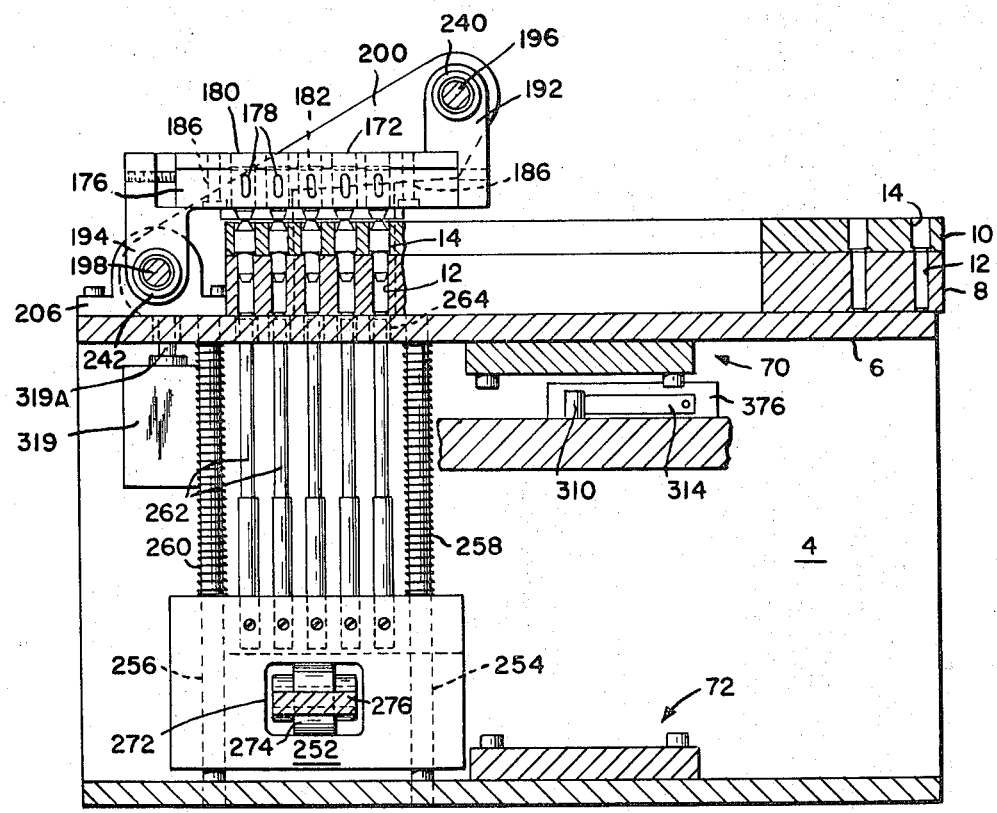
FIG. 8 is a vertical section taken on the plane indicated by the line 8—8 in FIG. 2.

Referring to FIG. 1 a capsule stop member 170 has secured thereto a bar 172 having a plurality of capsule receiving bores 174. The bar 172 comprises a lower portion 176 (FIG. 9) having a side opening 178 opening into each bore 174 and an upper portion 180. A capsule engaging O ring 182 is secured in each bore 174 between lower portion 176 and upper portion 180 of bar 172. The upper portion of bore 174 is flared out as indicated at 184 to facilitate the discharge of a capsule to the left as viewed in FIG. 11. As best seen in FIG. 8 lower portion 176 and upper portion 180 of bar 172 are held together by machine screws indicated at 186.

Stop member 170 is provided with enlarged hollow bosses 192 and 194 (FIG. 8) which are fixedly secured to rods 196 and 198 respectively which in turn are fixedly secured to arms 200 and 202 which normally rest on plate 6. A spacer sleeve 204 (FIG. 1) is positioned between boss 192 and arm 200. Rod 198 is mounted for rotation in brackets 206 and 208 which are secured to plate 6 (FIG. 1).

A carriage 220 has an upwardly extending hollow boss 222 which rides on rod 196 and a downwardly extending boss 224 which rides on rod 198. Carriage 220 carries rods 226 having conical ends 228 which are respectively in registry with openings 178 in bar 172 and which are each heated by a heating coil 230 supplied with power from a power line indicated at 232 (FIG. 1). A cam follower roller 234 mounted on carriage 220 is in engagement with cam 236 which has an enlarged portion 238 and is secured to shaft 94. Compression coil springs 240 and 242 mounted respectively on rods 196 and 198 between stop member 170 and carriage 220 bias roller 234 against cam 236. A pusher member 244 having a handle 246 passes freely through arm 202 and is adapted to engage carriage 220. A capsule stop plate 248 is fixedly secured to carriage 220 and is adapted to overlie bores 174 in bar 172 when carriage 220 is advanced to the heat sealing position. A locking lever 249 (FIG. 3) rotatably mounted on plate 6 engages a cam opening 250 in arm 202 to lock it in the position shown in FIG. 3.

A slide 252 (FIG. 8) is slidably mounted on rods 254 and 256 and biased downwardly by compression coil springs 258 and 260 mounted respectively on rods 254 and 256. A plurality of pusher rods 262 are secured to slide 252 and pass upwardly through openings 264 in plate 6 which are in registry with openings 12 and 14 in rings 8 and 10 respectively when the rings 8 and 10 are in the dwell position. Slide 252 also carries rods 266 (FIG. 2) which pass through openings 268 in plate 6 which are in registry with openings 12 and 14 of rings 8 and 10 respectively when the latter are in the dwell position.

Figure 2:
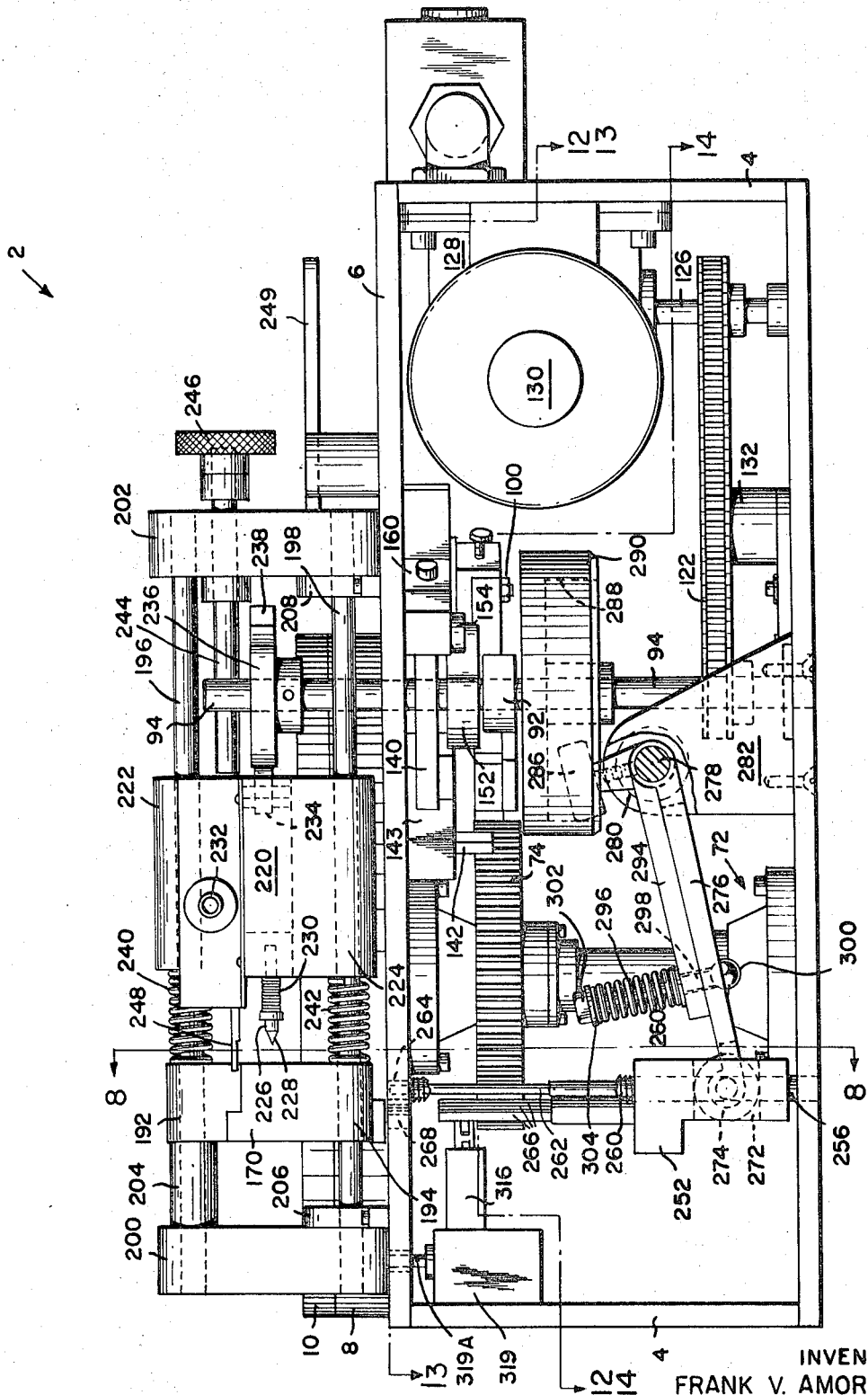
FIG. 2 is a rear elevation of the apparatus of FIG. 1.

Slide 252 has a central opening 272 (FIG. 8) which receives a roller 274 mounted on lever 276 which in turn is secured to shaft 278 between collars 280, 280 (FIG. 14), the shaft 278 being rotatably mounted in bearing member 282, 282. A cam follower roller 286 which engages the inner cam surface 288 of cup-shaped cam 290 (FIG. 2) secured to shaft 94 is secured to a lever 294 mounted for rotation on shaft 278 (FIGS. 2 and 14). Lever 294 is biased against lever 276 by a compression coil spring 296 which is carried by a pin 298 which passes through levers 276 and 294, has a headed portion 300 engaging lever 276 and is threaded to a nut 302 which bears against a washer 304 which in turn bears against spring 296.

As best seen in FIG. 12, gear 74 carries a pin 310 which is adapted to engage roller 312 of switch arm 314 to close switch 316 and stop motor 130. An override switch 318 (FIG. 1) in parallel with switch 316 is used to start motor 130. A safety switch 319 having an operating member 319A engaged by arm 200 when it rests on plate 6 opens the motor power circuit when arm 200 is raised.

The above described apparatus produces an end product capsule 320 (FIG. 6) which has a body 322 and a cap 324. The cap and body are dimpled and heat sealed together as indicated at 326.

OPERATION

Figures 9, 10, 11:
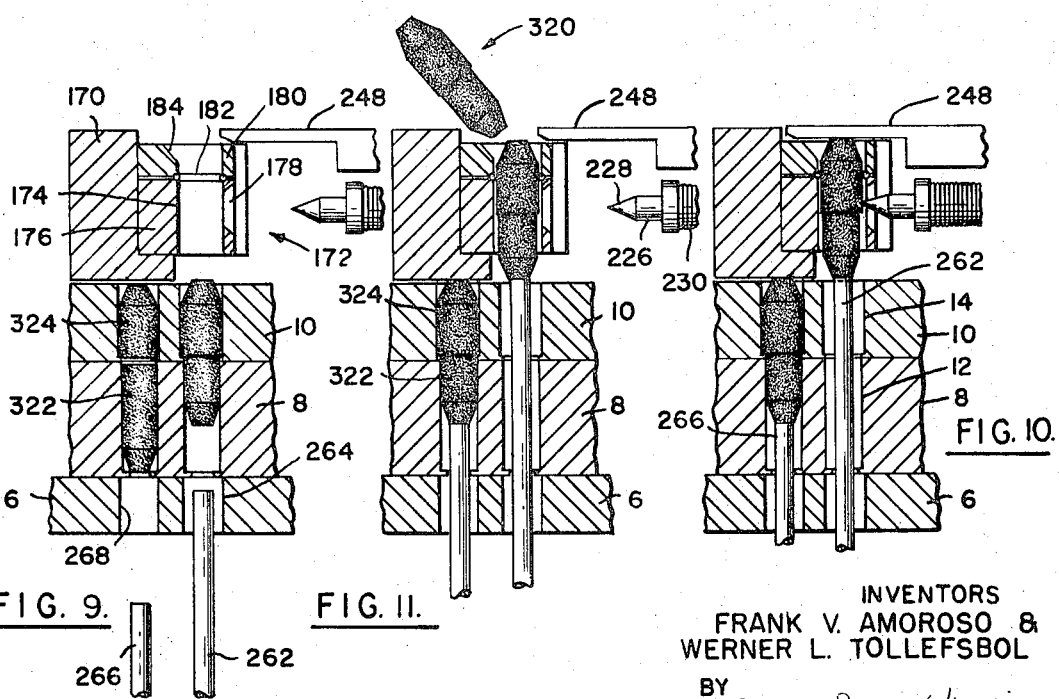
FIG. 9 is a vertical section partially broken away illustrating the relationship between the capsule parts and the associated plungers.
FIG. 10 is a vertical section partially broken away of the structure of FIG. 9 showing the plungers in the elevated position and the heat sealing mechanism in the heat sealing position.
FIG. 11 is a vertical section partially broken away of the structure of FIG. 9 showing the plungers elevated prior to heat sealing.

The capsule closing and heat sealing operation can be summarized by referring to FIGS. 9–11. The capsule caps 324 are retained in ring 10 while the filled bodies 322 are retained in ring 8. Rings 8 and 10 are stepped in increments equal to the angular distance between openings 268 and 264 in plate 6. When a cap 324 and body 322 are positioned over an opening 268, a rod 266 moves upwardly to force body 322 into cap 324 which is advanced against stop 170 to permit the complete closing of the capsule. Rings 8 and 10 are then stepped to the next position where the closed capsule is moved by pusher 262 into a bore 174 where it is held by virtue of the O ring 182 holding cap 324. After the pusher 262 has elevated, plate 248 advances with rods 226. With the capsule being held between plate 248 and rod 262 the conical point 228 of rod 226 applies heat and pressure to form the dimpled heat seal 326 shown in FIGS. 6 and 7. Plate 248, rod 226 and rod 262 are then withdrawn and rings 8 and 10 are indexed. Rod 262 then advances the next completed capsule into bore 174 which results in expelling the heat sealed capsule remaining in the bore 174. These operations are carried out simultaneously on five capsules. The carrying out of these individual operations will now be described in detail.

The loaded rings 8 and 10 are placed on plate 6 and disc 18 with bar 38 turned from its locking position to provide for the passage downwardly of ears 40 and 42 and with pin 20 forcing aside ball 34 and passing into opening 26. Bar 38 is elevated against the resistance of spring 48 and turned so as to overlie ears 40 and 42 where it is released.

Arms 200 and 202 and rod 196 which were pivoted out of the way to permit the placement of rings 8 and 10 are now pivoted into the operating position by rotating shaft 198 in brackets 206 and 208 and pushing to the left as viewed in FIG. 1 on handle 246 to cause rod 244 to urge carriage 220 to the left as viewed in FIG. 2 to permit roller 234 to clear cam 236, after which cam 246 is released permitting springs 240 and 242 to force roller 234 against cam 236. When the arms 200 and 202 rest on plate 6, lever 249 is rotated to engage cam opening 250 to lock arm 202 in the operating position.

After the heating coils 230 on rods 226 have reached the desired operating temperature, motor 130 is started by switch 318 to drive reduction gear 128 and shaft 126, sprocket 124, chain 122, sprocket 120, and shaft 94. Shaft 94 rotates cam 92 to advance ratchet 276 to rotate gear 74 an increment equal to the angular distance between openings 268 and 264 in plate 6. Next, the rotation of shaft 94 causes the rotation of cam 152 to permit spring 158 to urge finger 142 on arm 140 between the adjacent gear teeth of gear 74. This assures the accurate positioning of rings 8 and 10 with respect to the associated openings and also permits the ready retraction of ratchet 78 by spring 96 when permitted by the continued rotation of cam 92, the yielding of springs 80, 80 permitting the withdrawal of tooth 76 from gear 74.

During the period in which tooth 142 engages gear 74, the rotation of shaft 94 rotates cam 290 to cause cam surface 288 to pivot cam follower 286 clockwise as viewed in FIG. 2 and elevate levers 294 and 276 which in turn results in the elevation of slide 252 and the plungers 262 and 266. Spring 296 and pin 298 prevent excessive force being exerted on the capsules after they are tightly closed.

With plungers 262 and 266 being maintained in their upper positions shaft 94 rotates the raised portion 238 of cam 236 into contact with cam follower roller 234 which causes carriage 220 to move to the left as viewed in FIG. 2 with the result that plate 248 covers bores 174 and the conical ends 228 of rods 226 impinge against capsules 320 forming the dimple heat seals 326. Immediately thereafter, the continued rotation of cam 236 permits springs 240 and 242 to move carriage 220 to the right to retract rods 226 and plate 248. Substantially simultaneously the rotation of cam 290 permits springs 258 and 260. (FIG. 8) to move slide 252 downwardly and thus retract plungers 262 and 266 below the top of plate 6. Thereafter, cam 92 again advances ratchet 78 and the cycle is repeated until pin 310 opens switch 316.

It will be understood that the above described embodiment is by way of illustration and is not intended to be limiting.

We claim:

1. Capsule closing and heat sealing apparatus comprising:

a member having a bore therethrough for the reception of a capsule and a side opening communicating with the bore, a pair of mated rings, one of said rings having bores for the reception of a series of capsule caps and the other of said rings having bores for the reception of a series of capsule bodies in line with the caps, rotatable means to support the mated rings adjacent said member, a capsule stop mounted on the same side of the mated rings as the said member, means to rotate said support means stepwise to successively position the aligned bores in the said rings with the capsule stop and the bore in said member, pusher means to advance each capsule body into the adjacent capsule cap and to advance the body-cap combination against the capsule stop to complete their mating, pusher means to advance each mated capsule body and cap into the bore of the said member and expel a mated capsule body and cap from the bore, heat sealing means, and means to advance said heat sealing means into contact with a capsule through the said side opening communicating with the bore of the member to seal the cap to the associated body.

2. The apparatus of claim 1 having a reciprocating plate to restrain the top of the capsule when the heat sealing means is in contact with the capsule.

3. The apparatus of claim 1 in which the rotating means includes a ratchet and a gear and tooth means to lock the gear in a dwell position.

4. The apparatus of claim 1 having pin means to align the rings with the rotatable support means.

5. The apparatus of claim 1 in which the heat sealing means comprises a reciprocable carriage, rods secured to the carriage, means to heat the rods.

6. The apparatus of claim 5 in which the carriage is pivotally mounted to provide clearance for installing and removing the rings.

7. The apparatus of claim 5 in which the carriage is reciprocated by cam means.

8. The apparatus of claim 1 in which an O ring having a diameter slightly smaller than the capsule cap is secured in the upper portion of the bore in the member to space the capsule in the bore clear of the member.

References Cited

UNITED STATES PATENTS

| 2,799,983 | 7/1957 | Cook et al. | 53—299 |
| 2,940,234 | 6/1960 | Greer | 53—285 |

TRAVIS S. McGEHEE, Primary Examiner

U.S. Cl. X.R.

53—282, 329